(12) United States Patent
Grist et al.

(10) Patent No.: US 10,704,837 B2
(45) Date of Patent: Jul. 7, 2020

(54) LABORATORY CONDENSERS WITH PASSIVE HEAT EXCHANGE

(71) Applicant: R.B. RADLEY & COMPANY LIMITED, Essex (GB)

(72) Inventors: Matthew Grist, Cheshire (GB); David Perkins, Chestier (GB)

(73) Assignee: R.B. RADLEY & COMPANY LIMITED, Essex (GB)

( * ) Notice: Subject to any disclaimer, the term of this patent is extended or adjusted under 35 U.S.C. 154(b) by 256 days.

(21) Appl. No.: 14/372,098

(22) PCT Filed: Apr. 5, 2013

(86) PCT No.: PCT/GB2013/050897
§ 371 (c)(1),
(2) Date: Jul. 14, 2014

(87) PCT Pub. No.: WO2013/150318
PCT Pub. Date: Oct. 10, 2013

(65) Prior Publication Data
US 2014/0360706 A1 Dec. 11, 2014

(30) Foreign Application Priority Data
Apr. 5, 2012 (GB) .................................. 1206103.2

(51) Int. Cl.
*F28D 7/10* (2006.01)
*B01D 5/00* (2006.01)
(Continued)

(52) U.S. Cl.
CPC ............. *F28D 7/10* (2013.01); *B01D 5/0009* (2013.01); *B01D 5/0012* (2013.01);
(Continued)

(58) Field of Classification Search
CPC .. B01D 5/0063; B01D 5/0009; B01D 5/0012; B01D 5/0003; F28F 21/006;
(Continued)

(56) References Cited

U.S. PATENT DOCUMENTS 1,936,166 A * 11/1933 Kendall .................... F16L 3/22
165/154
3,967,591 A * 7/1976 Iida .......................... F22B 1/063
122/32

(Continued)

FOREIGN PATENT DOCUMENTS

CN 101765563 A 6/2010
DE 606284 8/1948
(Continued)

OTHER PUBLICATIONS

Chinese Application No. 201380023516.1 Office Action dated Jun. 9, 2015, (corresponding CN), including English translation, 18 pages.
(Continued)

*Primary Examiner* — Devon Russell
(74) *Attorney, Agent, or Firm* — Daly Crowley Mofford & Durkee, LLP (57) ABSTRACT

The present invention relates to a condenser for condensing gasses. The condenser comprises: an inner tube (1) having a bore (3) therethrough; an outer tube (2) having a bore (8) therethrough and two ends, the inner tube (1) passing through the bore of the outer tube (2); and a seal (15, 16) at each end of the outer tube. The outer tube has exterior and interior fins and is sealed to the inner tube so as to define a sealed space (11) between the inner tube and the outer tube. The space (11) is adapted to contain a liquid in contact with the inner tube (1) and the outer tube (2). The invention further relates to a method of condensing a gas using the
(Continued)

condenser, a process of making a chemical using the condenser and a kit adapted to be assembled into the condenser.

14 Claims, 6 Drawing Sheets

(51) Int. Cl.
| | |
|---|---|
| *F28F 21/00* | (2006.01) |
| *F28F 1/42* | (2006.01) |
| *F28F 21/08* | (2006.01) |
| *F28F 1/00* | (2006.01) |
| *F28F 1/16* | (2006.01) |
| *F28F 13/00* | (2006.01) |
| *F28D 21/00* | (2006.01) |
| *F28D 15/02* | (2006.01) |

(52) U.S. Cl.
CPC ......... *B01D 5/0033* (2013.01); *B01D 5/0063* (2013.01); *F28F 1/003* (2013.01); *F28F 1/16* (2013.01); *F28F 1/422* (2013.01); *F28F 1/426* (2013.01); *F28F 21/006* (2013.01); *F28F 21/084* (2013.01); *F28D 7/106* (2013.01); *F28D 15/0233* (2013.01); *F28D 2021/0063* (2013.01); *F28F 2013/006* (2013.01); *F28F 2220/00* (2013.01); *F28F 2230/00* (2013.01); *F28F 2265/26* (2013.01); *F28F 2275/20* (2013.01)

(58) Field of Classification Search
CPC ...... F28F 2021/0063; F28F 1/42; F28F 1/422; F28F 1/426; F28F 1/424; F28D 7/10; F28D 7/103; F25B 39/04
USPC .................. 165/141, 154, 180, 179
See application file for complete search history.

(56) References Cited

U.S. PATENT DOCUMENTS

| | | | |
|---|---|---|---|
| 4,187,903 A | | 2/1980 | Judson |
| 4,194,560 A | * | 3/1980 | Matsuzaki ............... F01P 11/08 |
| | | | 165/141 |
| 4,250,958 A | * | 2/1981 | Wasserman ............. F28D 20/02 |
| | | | 126/618 |
| 4,345,644 A | * | 8/1982 | Dankowski ........... F28D 1/0246 |
| | | | 165/154 |
| 4,404,062 A | * | 9/1983 | Whitehurst ............. B01D 3/00 |
| | | | 202/185.3 |
| 4,511,435 A | | 4/1985 | Strohschein |
| 4,740,981 A | * | 4/1988 | Kleisle ................... B25B 1/241 |
| | | | 165/139 |
| 4,770,746 A | * | 9/1988 | Mayo ................... B01D 3/4205 |
| | | | 159/DIG. 16 |
| 4,778,002 A | * | 10/1988 | Allgauer ................. F16N 39/02 |
| | | | 165/141 |
| 5,361,587 A | | 11/1994 | Hoffman |
| 5,735,342 A | * | 4/1998 | Nitta ....................... F28D 7/106 |
| | | | 165/121 |
| 6,113,744 A | | 9/2000 | Munro |
| 6,938,427 B1 | | 9/2005 | Wood |
| 7,487,824 B2 | * | 2/2009 | Lin ....................... H01L 23/427 |
| | | | 165/104.33 |
| 2001/0004009 A1 | * | 6/2001 | MacKelvie ......... F24D 17/0005 |
| | | | 165/47 |
| 2005/0155748 A1 | | 7/2005 | Seager |
| 2006/0107682 A1 | | 5/2006 | Park et al. |
| 2007/0187067 A1 | * | 8/2007 | Horiguchi ............... F28D 7/106 |
| | | | 165/70 |
| 2008/0149309 A1 | * | 6/2008 | Li ......................... F28D 7/0016 |
| | | | 165/104.19 |
| 2008/0277092 A1 | | 11/2008 | Layman et al. |
| 2012/0006670 A1 | | 1/2012 | Kamen et al. |

FOREIGN PATENT DOCUMENTS

| | | | |
|---|---|---|---|
| DE | 4033677 A1 | | 4/1992 |
| DE | 4231458 A1 | | 3/1994 |
| GB | 606284 | | 8/1947 |
| GB | 606284 A | * | 8/1948 |
| GB | 1588119 A | | 4/1981 |
| JP | 59142381 A | | 8/1984 |
| JP | S 6273088 | | 4/1987 |
| JP | S6273088 A | | 4/1987 |
| JP | S62-284193 | | 12/1987 |
| JP | S 62284193 | | 12/1987 |
| JP | S62284193 A | | 12/1987 |
| JP | 5-327317 | | 12/1993 |
| JP | H05327317 A | | 12/1993 |
| KR | 20100132212 A | | 12/2010 |
| WO | WO 99/46048 A2 | | 9/1999 |

OTHER PUBLICATIONS

GB Application No. 1206103.2, Search Report dated Aug. 6, 2012, (corresponding UK), 2 pages.
Japanese Office Action dated Jun. 29, 2017 from Japanese Pat. App. No. 2015-503947 with English Translations; 6 Pages.
Japanese Notice of Reasons for Rejection dated Nov. 22, 2016 for JP Pat. Appl. No. 2015-503947; 5 pages.
EPO Communication pursuant to Article 94(3) EPC dated Dec. 20, 2015 for EP Pat. Appl. No. 13723536.2-1371: 6 pages.
PCT International Search Report dated Aug. 5, 2013 for PCT Application No. PCT/GB2013/050897; 4 Pages.
Indian Hearing Notice dated Feb. 21, 2019 for Indian Application No. 2102/MUMNO/2014; 3 Pages.
Indian Examination Report dated Jun. 13, 2018 for Indian Application No. 2102/MUMNP/2014; 6 Pages.

* cited by examiner

Fig 17 section XVII-XVII

LABORATORY CONDENSERS WITH PASSIVE HEAT EXCHANGE

This invention relates to condensers, and to a method of using such condensers.

It is often desired to condense a gas into a liquid. Typically, this is done by reducing the temperature of the gas below its boiling point.

In some circumstances a phase change of liquid to gas is desirable and employed as a means of separating components of the reaction mixture (for example, evaporation or distillation). In this case, it is usually desirable to separate the vapour or gas from the liquid phase, before converting it back to the liquid phase and collecting it separately to the remaining components in the reaction mixture. A condenser is generally employed to convert the vapour or gas back to liquid, to allow it to be collected.

In other circumstances, the phase change may result in an undesirable loss of reaction components and a means of preventing loss of these components is desirable. In this case, the vapour or gas is required to be converted back to a liquid in such a way that it can be returned to the original reaction mixture. A condenser is generally employed to convert the vapour or gas back to liquid. Positioning the device directly above and connected to the reaction vessel allows the condensed vapour or gas to be returned to the reactor. This process is typically referred to as refluxing.

In a laboratory setting condensers are usually either air-cooled, comprising a length of tube (typically glass) at the local temperature, or are water-cooled, comprising a length of tube (also typically glass) surrounded by a jacket through which running water passes. An example of the latter condenser is the well-known Liebig condenser.

The air-cooled condenser has been found to be not particularly efficient, as it depends on transfer of the heat from the glass tube directly to atmosphere. An improvement to straight-tube air-cooled condensers is found in the Vigreux condenser, where the internal surface of the tube is provided with many protrusions which increase the surface area over which the gas to be condensed passes.

Water-cooled condensers function more efficiently, but require a constant flow of water in order to function. Water is becoming an increasingly expensive and scarce resource, and disposing of water from laboratories is also becoming increasingly complex and expensive.

It has been proposed in U.S. Pat. No. 4,187,903 to provide a water-cooled condenser where the water coolant is circulated through a closed loop, passing through the jacket of a Liebig-style condenser and an external member having a heat sink. However, this is inefficient, as it relies on eddy currents building up in the liquid to start circulation of the water. That document also proposes mounting a heat sink directly on an air-cooled condenser, but that presents significant problems attaching or bonding the heat sink to the glass condenser such that sufficient heat transfer takes place.

According to a first aspect of the invention, there is provided a condenser for condensing gasses, comprising:
  an inner tube having a bore therethrough;
  an outer tube having a bore therethrough and two ends, the inner tube passing through the bore of the outer tube; and
  a seal at each end of the outer tube, sealing the outer tube to the inner tube so as to define a sealed space between the inner tube and the outer tube, in which the space contains, or is adapted to contain, a liquid in contact with the inner tube and the outer tube.

As such, by providing a liquid-filled sealed space, heat transfer from the inner tube to the outer tube can be improved without the need for directly mounting the outer tube on the inner tube; heat from vapours passing through the bore of the inner tube can then be removed through the inner tube, transferred to the outer tube then radiated away. As the liquid is sealed within the sealed space, there is no need to continually provide replacement water or to dispose of discharged water.

Since making the present invention we have become aware of some prior art cited against our first-filed GB patent application.

JP 62284193 relates to a system for generating ice (or retaining heat) in the night or day and using the stored heat/cold to influence the environment/building at a different time. Part of the system is a double walled tube with a high heat capacity material between them, liquid or solid material, and fins extending from the outer tube to the inner tube, and also from the inner tube to the outer tube. Fins extend from the outer surface of the outer tube. There are no fins inside the inner tube. Both the inner and outer tubes are metal. A hot or cold liquid is flowed through the inner tube and heat given up or taken from the thermal store material held between the tubes. This teaching is about a high thermal capacity heat store, not condensing vapours in chemical reaction systems.

DE 4033677 is a disclosure relating to injection moulding machines. It is not anything to do with refluxing vapour in laboratory/chemical reaction systems. It does not seem to have any fins, and appears to be made of metal, with no glass inner tube.

U.S. Pat. No. 4,187,903 and GB 1588119 relate to an Aldrich air flux system. They do not have the combination of features that we use and are the prior art over which we improve.

US 2005/155748 relates to heat exchangers for vehicles. It has a cooling oil pumped through a cavity between an outer and inner tube. It does not have a contained body of fluid in the space between the inner and outer tube, with no inlet and outlet for pumping the cooling fluid. It is not concerned with condensing vapours inside the inner tube. It is mainly of an all-metal construction. There are fins in the cavity between the inner and outer tube only, not extending outwards from the outer tube, and inwards in the inner tube. It is mainly directed towards the end fittings disclosed. It does not seem to be an air-cooled system really.

JP 5914 2381 is another heat exchanger exchanging heat between two flowing fluids. This is quite different from an air cooler with a volume of trapped heat exchange fluid. This does not relate to condensing a vapour. There are no external fins for air cooling.

US 2008/277092 is another heat exchanger having no fins. It has a circulating gas for cooling, and it points away from the concept of a trapped volume of fluid as a heat exchange system. It is not related to condensing, and uses recirculating liquid coolant through a static transfer fluid.

US 2006/107682 is another part of an air conditioning unit. It relates to the extraction of heat from a high-pressure liquid refrigerant to a flowing liquid or to air. There are no fins, and no condensing going on.

KR 20100132212 appears to relate to a heat exchanger for cooling a flowing liquid, rather than condensing anything. The materials used are not the same as those that are important to us.

Returning to a discussion of the present invention, typically, the outer tube will have a plurality of internal fins extending into the space. The outer tube may also have a plurality of external fins extending outwardly from an outer surface of the outer tube. The external fins will increase the heat loss to the local atmosphere, whereas the internal fins will increase the heat transfer to the outer tube. Each of the internal or external fins may be ridged, in order to increase their surface area.

Preferably the internal fins of the outer tube will be of a length such that they do not touch the surface of the inner tube. This allows for good circulation of fluid/liquid in the space defined between the inner and outer tubes. It also avoids problems with expansion of the tubes (e.g. the differential expansion of the metal and glass). At least in some embodiments, connective flow/currents in the liquid trapped in the space between the two tubes may make a useful contribution to the overall heat transfer and we do not want to block that off too much by having the fluid partitioned completely into zones.

Preferably, the outer tube will be formed of a heat conductive material. The heat conductive material may comprise a metal material, such as aluminium. Aluminium has the benefits that it can be conveniently extruded or rolled in order to form the internal and external fins, and is a good conductor of heat. Other materials that could be used include copper and steel.

The liquid will typically be heat-conductive liquid with good heat transfer properties to remove heat from the inner tube as quickly as possible. The liquid may be water. Water is relatively cheap and plentiful, particularly when the volume sealed in the space will not be continually replaced. It also functions acceptably as a conductor of heat. As an alternative, oils such as silicone oils, glycols or synthetic oils could be used as the liquid, as they are better conductors of heat, but are more costly.

Typically, the liquid will substantially fill the space, preferably almost entirely filling the space (e.g. 99%, 95%, 90% or >85% filling the space). It is likely that the liquid will fill at least half of the space.

The inner tube may be exposed to high levels of chemicals, vapours and generally corrosive materials so must be formed from a material with high chemical inertness. Furthermore, it must show good heat conductive properties.

The inner tube may be formed of glass, typically borosilicate glass. Glass is chemically inert and cheap. In most embodiments, the inner tube needs to be chemically inert, or else the hot condensing vapour (or chemicals contained within the vapour) inside it will corrode it and the chemical reaction wanted will be contaminated by material from the inner tube. Inert metals, such as gold or platinum, may be acceptable technically, but are too expensive commercially. Cheaper metals, for example aluminium or steel can be used if a chemically inert coating, such as a fluoropolymer based coating, is applied to them, but this coating can be difficult to apply, and can be easily mechanically damaged. We prefer glass. The inner tube may be formed with protrusions into its bore; these protrusions add to the surface area of the inner bore, providing a greater area for the gas to condense upon and disrupting the flow of the gas through the bore. As such, the inner tube may comprise a Vigreux condenser.

The outer surface of the inner tube may have indentations and/or projections. These may increase the surface area of the outer tube that is exposed to the fluid held between the inner and outer tube, improving heat transfer.

In some embodiments the inner tube may have inwardly-extending indents in its wall, the indents forming both inwardly-extending projections into the space inside the inner tube, and also inwardly-projecting hollows in the outer surface of the inner tube. The hollows/indents increase the contact between the outer surface of the inner tube with the cooling heat-transfer liquid that is in the space between the inner tube and the outer tube, as well as increasing the contact area between the inner surface of the inner tube and the liquid/vapour being condensed.

In some embodiments, but not in all, the inner tube may be provided with a key for at least one of the seals, the or each seal sealing against the respective key. The or each key may comprise a bulge in an outer diameter of the inner tube. The or each seal may comprise a first part and a second part that fit either side of the bulge and interengage. The first part may seal against the inner tube, and the second part may engage against the outer tube. A sealant may be provided between the first part and the inner tube, between the first part and second part, and between the second part and the outer tube.

Figure 12:
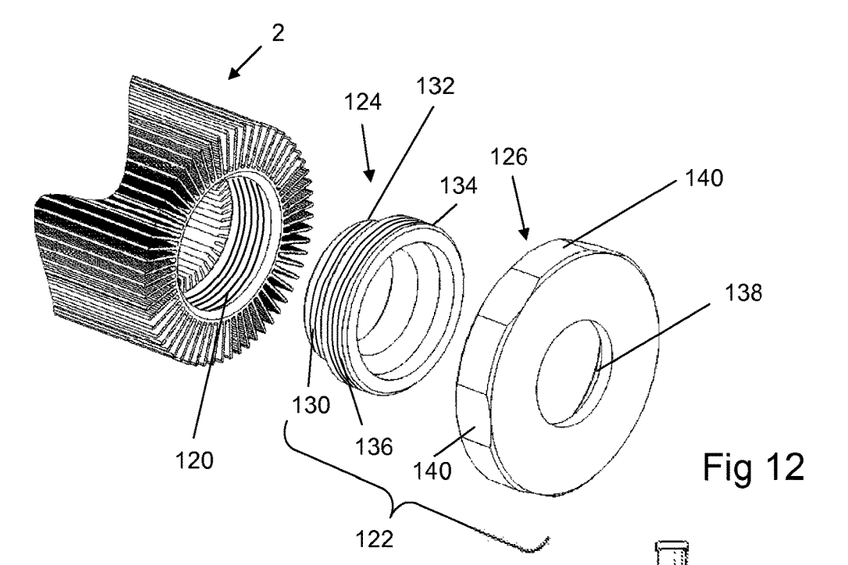
FIG. 12 shows an end seal of the condenser in one embodiment.
Figure 13:
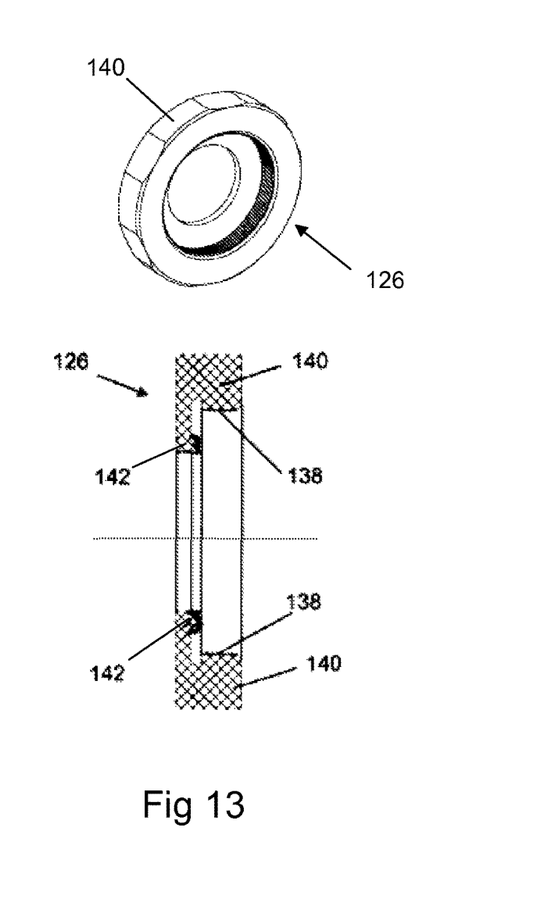
FIG. 13 shows detail of one component of the end seal of FIG. 12.

In some embodiments the longitudinally axially-spaced ends of the outer tube 2 have a screw thread coupling formation 120 surrounding the inner surface of the outer tube. FIGS. 12 and 13 illustrate such an embodiment. A screw-threaded end seal 122, possibly of plastics material, screws into the coupling formation and closes the end of the outer tube off, bridging to the outer surface of the inner tube (which extends through the seal). The seal 122 may be made of two components: a first component 124 that screws into the end of the outer tube and seals to the outer tube, and a second component 126 which connects to the first component in a sealing manner and that is also adapted to seal to the outer surface of the inner tube. The inner tube may have a smooth cylindrical outer surface at the regions where it engages the end seal. The first component 124 in this embodiment seals to the (metal) outer tube by means of a sealant compound that is applied liquid and sets, for example a high temperature silicone sealant compound The second component 126 in this embodiment seals to the (glass) inner tube by means of a sealant compound that is applied liquid and sets, for example a high temperature silicone sealant compound. A resilient gasket or other sealing member may be provided to engage the inner tube, the gasket being held between the first and second components.

The end seal 122 may be provided with one or more flat surfaces 140 (flats) which are disposed radially outside the cylindrical envelope of fins on the outside of the outer tube. The flats help prevent the assembled condenser from rolling when laid on a bench surface. This helps to stop the condenser falling off the bench and being damaged. The flats 140 are preferably provided on the outer circumference of the second component 126. There may be, for example, six flats around the circumference.

The end seals may be made of a non-reactive plastic material, such as acetal.

The first component 124 has a first screw thread 130 on its outer cylindrical surface 132. The thread 130 is complementary to the screw-threaded formation 120 on the end of the outer tube 2. The first component has a cylindrical spigot 134 of wider radius than that of the screw thread 130. The spigot 134 also has a screw thread 136. The screw thread 136 of the spigot 134 screws into an internal screw thread 138 provided in the second component 126, the thread 138 surrounding the hole in the second component 126 through which the inner tube extends.

FIG. 13 shows the second component 126 in more detail and shows a view of component 126 from the opposite side to that shown in FIG. 12.

The second component 126 also has an annular rib 142 which provides the function of dispersing the liquid sealant compound contained in the cavity of the assembled first component when component 126 is screwed onto component 124 and helps seal the two components to each other so as to stop heat transfer fluid/liquid escaping from between them.

Figure 14:
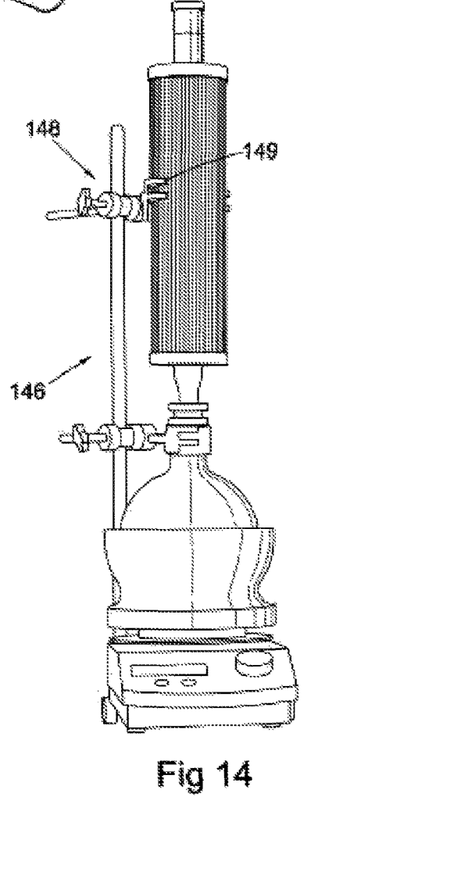
FIG. 14 shows another way of using the present invention.

FIG. 14 shows the condenser in use. It shows a conventional retort stand 146 having clamps 148 with fingers 149. It will be seen that the clamps 148 can hold the outer cylindrical surface/envelope created by the tips of the exterior fins of the outer tube. Care needs to be taken not to overtighten the clamps and deform the fins, but clamping the condenser using existing retort stand equipment is easy.

Figure 15:
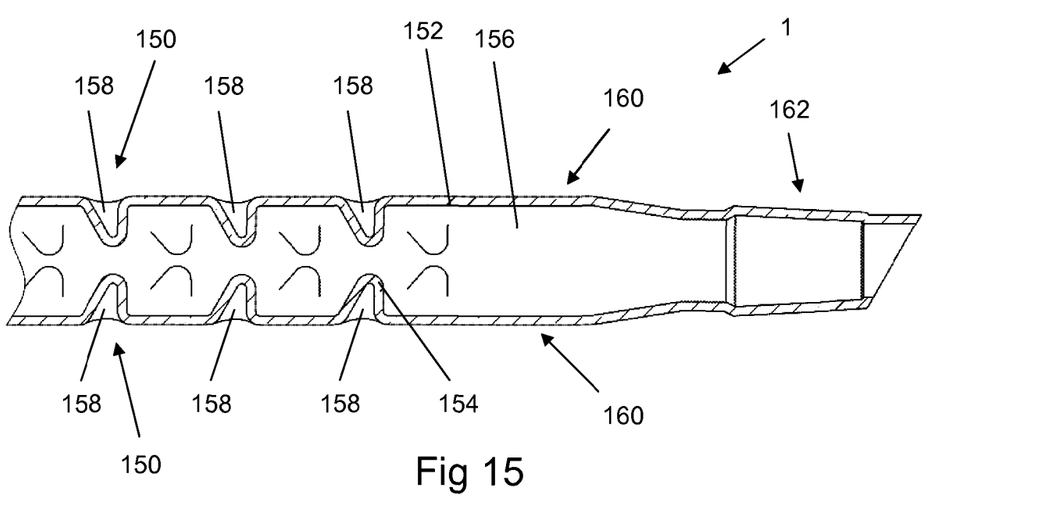
FIG. 15 shows a cross-sectional view of the inner tube of an embodiment of the invention.
Figure 16:
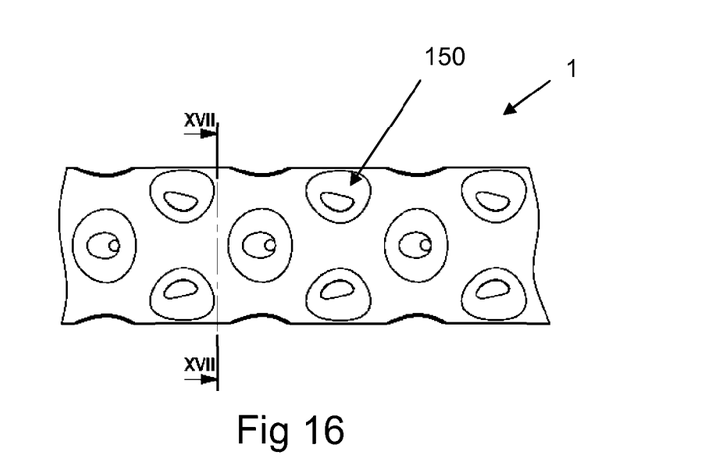
FIG. 16 shows a plan view of part of the inner tube of FIG. 15.

FIG. 15 shows a glass inner tube 1 provided with hollow indents 150 in its wall 152. The indents form projections 154 that extend into the space 156 inside the inner tube in which the vapour to be condensed exists. The indents also provide pockets 158 in the outer wall of the inner tube 1 into which the heat transfer fluid/liquid (typically water) extends. This simultaneously assists heat transfer between the vapour and the inner tube, and between the inner tube and the heat transfer liquid that surrounds it.

Figure 17:
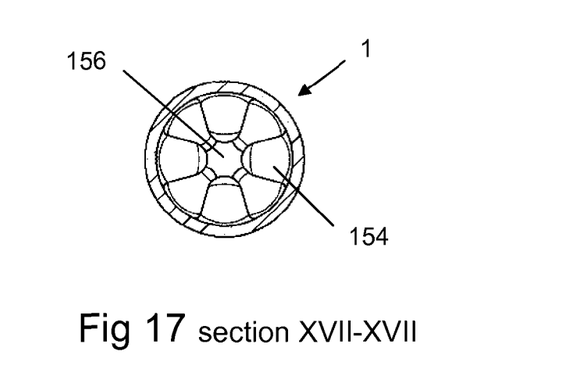
FIG. 17 shows a cross-sectional view of the inner tube viewed on line XVII-XVII of FIG. 16.

As will be seen in FIG. 17, the projections 154 extend close to the central axis of the inner tube, but do not reach the central axis—they stop short. There are two sets of projections, a first set, and a second set interleaved with the first set, and rotated about the central axis by 45 degrees. This achieves a better interruption of rising vapour and better heat transfer.

FIG. 15 shows a smooth, non-indented, region 160 at one end of the inner tube 1, adjacent a ground glass connector 162. The small region 160 is where the end seal 122 seals to the inner tube.

Herein, when we refer to condensing a gas, we also include condensing a vapour.

According to a second aspect of the invention, there is provided a method of condensing a gas, comprising passing the gas through the bore of the inner tube of the condenser of the first aspect of the invention, the temperature of the gas being higher than the temperature of the outer tube.

Thus, this provides a method of condensing gasses which does not require continual running water.

Typically, the method will comprise collecting condensate formed by condensing the gas. The gas may be from or of a solvent such as methanol, ethanol, isopropyl alcohol, diethyl ether, tetrahydrofuran, ethyl acetate, dioxane, heptane, acetonitrile, toluene, acetone, dichloromethane or chloroform.

It will be appreciated that by not having a continuous flow of cooling fluid/liquid passing through the cavity between the outer tube and the inner tube, we do not consume large amounts of coolant (e.g. water). Our invention relates to that class of condensers that do not have a flowing system of liquid coolant to take away heat. In the vast majority of situations, our condenser will be an air-cooled condenser. We do not mean to exclude situations where users put the condenser in a fluid that is not air (e.g. in a bath of water).

We have appreciated that it is possible to improve an air-cooled condenser for a laboratory chemical reactor system. Retaining a heat transfer fluid between the inner and outer tubes (instead of having a flowing fluid such as in a Liebig condenser) saves water/resources. We have made a better air-cooled condenser. The results from the table on page 13 show that. An extruded metal tube (preferably aluminium) finned externally (and optionally internally) has better heat transfer capabilities to air than glass, but a metal tube for contact with hot corrosive vapours is not desirable. A glass inner tube has acceptable heat transfer characteristics, especially when assisted by a liquid in contact with it to couple it thermally to the metal outer tube, and can withstand the chemical vapours. We have appreciated that with this simple and elegant combination we can make a better air-cooled condenser.

There now follows, by way of example only, description of an embodiment of the invention, described with reference to the accompanying drawings, in which.

A condenser 100 according to an embodiment of the invention is shown in the accompanying drawings. The heat exchanger comprises a central inner tube 1 surrounded by an outer tube 2.

We envisage our condenser being used in laboratories where people are trying to synthesise or isolate chemicals. Typically, it will be used to condense or reflux vapour leaving a heated chemical reactor vessel, such as a flask.

The inner tube 1 is formed of borosilicate glass. It has an internal bore 3 for the passage of the gas to be condensed. The inner tube has a top end 4 and a bottom end 5. The inner tube 1 has a plurality of protrusions 6 extending into the bore 3, in the manner of a Vigreux condenser.

The outer tube 2 is formed of extruded aluminium, and so is of consistent cross section along most of its length. It is of the form of a cylindrical shell 7 having an internal bore 8. Into this internal bore 8 extend a plurality of internal fins 9; in the present embodiment, there are 45 such fins equally spaced around the circumference of the cylindrical shell 7, extending along the length of the shell 7. The fins extend radially into the bore 8 by a consistent internal fin length, so that a cylindrical passage 10 is provided, which is occupied by the inner tube 1.

Thus, between the inner tube 1 and the outer tube 2 there is defined a space 11 into which the internal fins 9 extend. This space is filled with a liquid 12, in contact with both inner 1 and outer 2 tubes, the liquid 12 being used as a heat-conducting liquid. Therefore, heat can easily pass from the inner tube 1 through the liquid 12 to the outer tube. The liquid has good heat transfer properties, and may be water.

By "filled" with a liquid, we do not necessarily mean completely filled: we also envisage partially-filled arrangements, but we do also mean completely filled, or nearly so.

Figure 1:
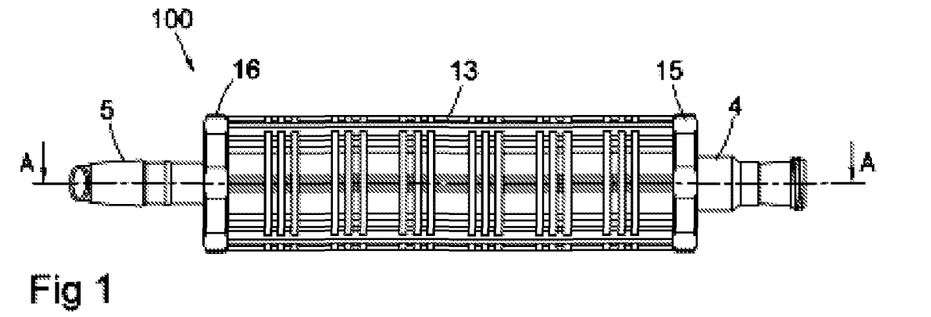
FIG. 1 shows a condenser according to an embodiment of the invention.
Figure 2:
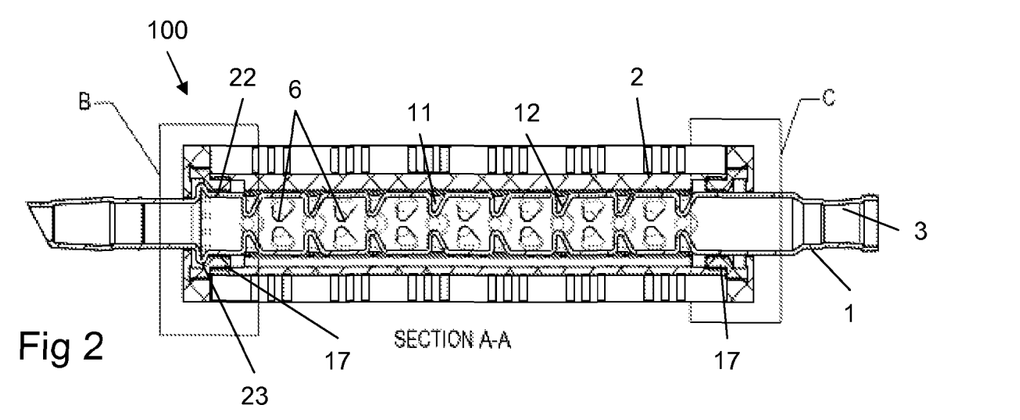
FIG. 2 shows a cross section through the condenser of FIG. 1 along line A-A.
Figure 3:
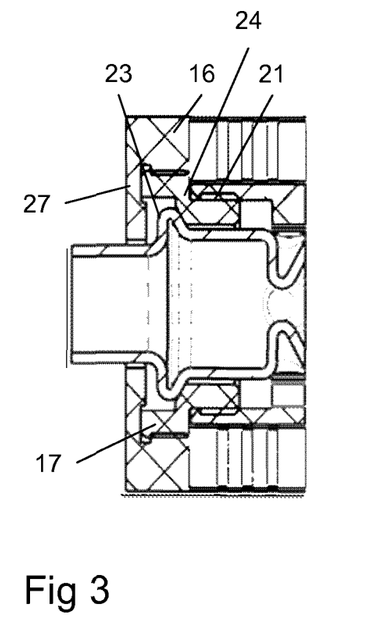
FIG. 3 shows an enlargement of area B of FIG. 2.
Figure 4:
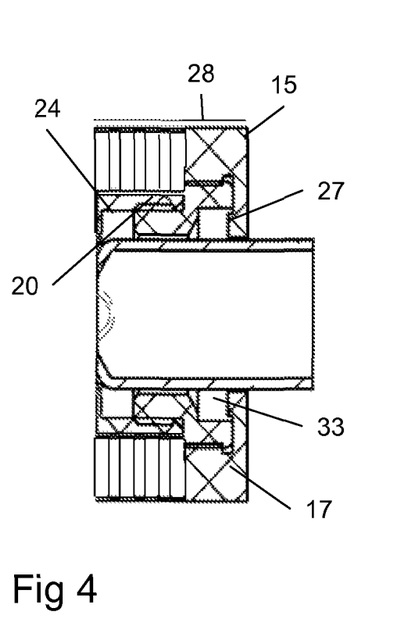
FIG. 4 shows an enlargement of area C of FIG. 2.
Figure 5:
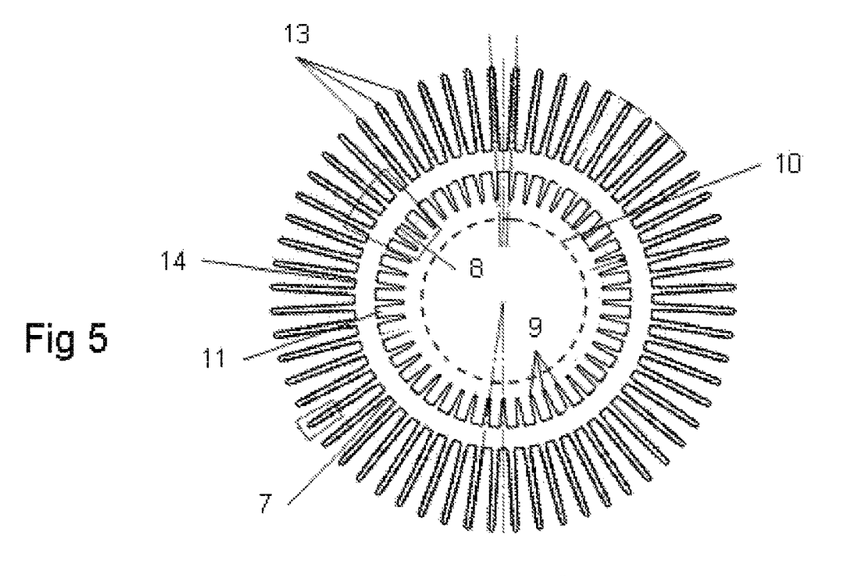
FIG. 5 shows a cross section through the outer tube of the condenser of FIG. 1.
Figure 6:
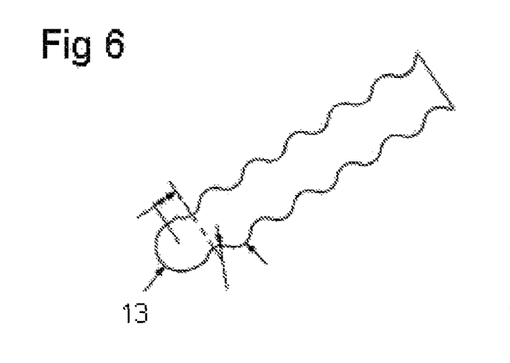
FIG. 6 shows an enlargement of area B of FIG. 5.
Figure 7:
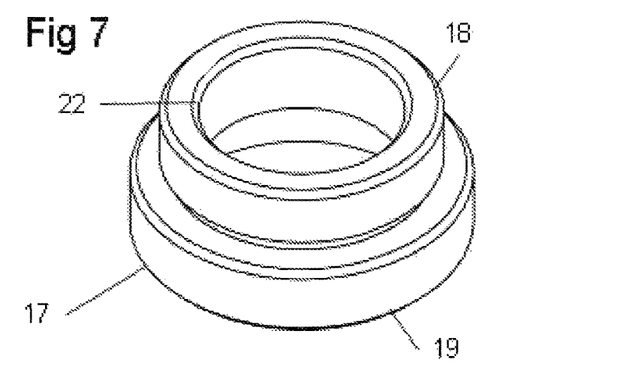
FIG. 7 shows a perspective view of the common first part of the seal at either end of the condenser of FIG. 1.
Figure 8:
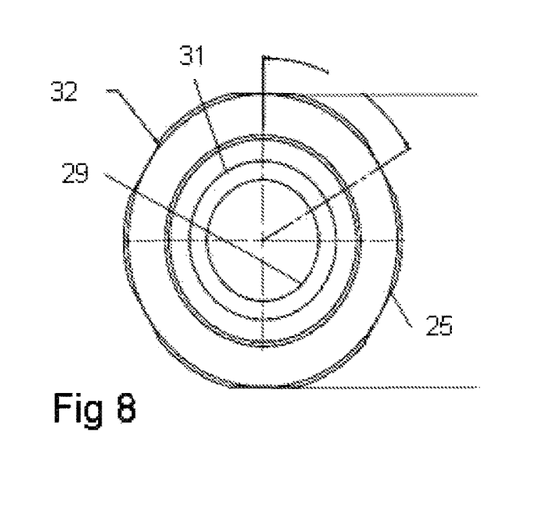
FIG. 8 shows a plan view of the second part of the seal for use at the top end of the condenser of FIG. 1.
Figure 9:
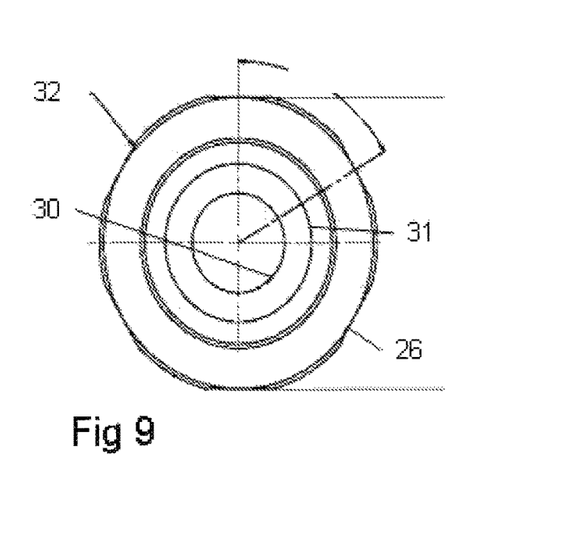
FIG. 9 shows a plan view of the second part of the seal for use at the bottom end of the condenser of FIG. 1.

In order to dissipate the heat transferred to the outer tube 2, the outer tube 2 is provided with external fins 13 extending along the length of the cylindrical shell 7 and radially outwards from an outer surface 14 of the cylindrical shell 7. In this embodiment, there are 60 such external fins 13 equally spaced around the circumference of the cylindrical shell 7. The external fins have a ridged profile (shown in more detail in FIG. 6 of the corresponding drawings) which increases the surface area of the external fins, which improves the heat transfer from the outer tube 2 to the surrounding air.

In order to seal the space 11, a top seal 15 and a bottom seal 16 are provided. These seal the outer tube 2 and inner tube 1 together, and each seal one end of the space 11.

Each of the seals 15, 16 comprise a common first part 17. This comprises an annular plastic member, formed of acetal. The first part 17 has a step in external diameter, and as such is made up of a narrower portion 18 and a wider portion 19. The external circumferential surfaces of both portions 18, 19 are threaded. The thread of the narrower portion 18 engages a corresponding thread 20, 21 formed in the internal bore 8 at the respective end of the outer tube 2, so as to fix the first portion relative to the outer tube 2.

The first part 17 has a through-hole 22 through which the inner tube passes. In one embodiment (but not in others) the inner tube 1 is provided with a bulge 23 in diameter at its bottom end bigger than the through-hole 22, so that the bulge 23 cannot pass through the first part 17 but will rest against it. This may help to locate the tubes relative to each other. The gap 24 defined between the first part 17 and the outer tube 2 is filled with a sealant, such as polyurethane or an o-ring seal.

Each of the seals also comprises a generally annular second part 25, 26; different second parts may be provided for the top end (top second part 25) and bottom end (bottom second part 26). However, the function of both parts is similar. Each second part 25, 26 has a narrow potion 27 of reduced internal diameter compared to a wider portion 28. The wider portion 28 is provided with an internal thread, which engages the thread of the wider portion 19 of the first part 17, so as to fix the two parts together.

The narrow portion 27 has an internal through-hole 29, 30; the through-hole 29 of the top seal 15 may be bigger than the through-hole 30 of the bottom seal 16 as the inner tube 1 may differ in diameter from top to bottom. The narrower portions also have a groove or ridge 31 on the face that will contact the end face of the outer tube. This groove or ridge 31 is of the same diameter as the cylindrical shell 7. The groove or ridge 31 provides location 33 for further sealant of the same material as discussed above to be trapped between the inner tube 2 and first part 17, further sealing the space 11.

The second parts 25, 26 are provided with flats 32, so that the condenser 100 is less likely to roll if placed on a flat surface.

In use, a gas to be condensed is passed through the internal bore 3 of the inner tube 1, typically from bottom end 5 to top end 4. The gas to be condensed will typically be mixed with other gasses, such as air. The gas will be at above the local temperature and notably above the temperature of the outer tube 2 and thus the inner tube 1.

Figure 11:
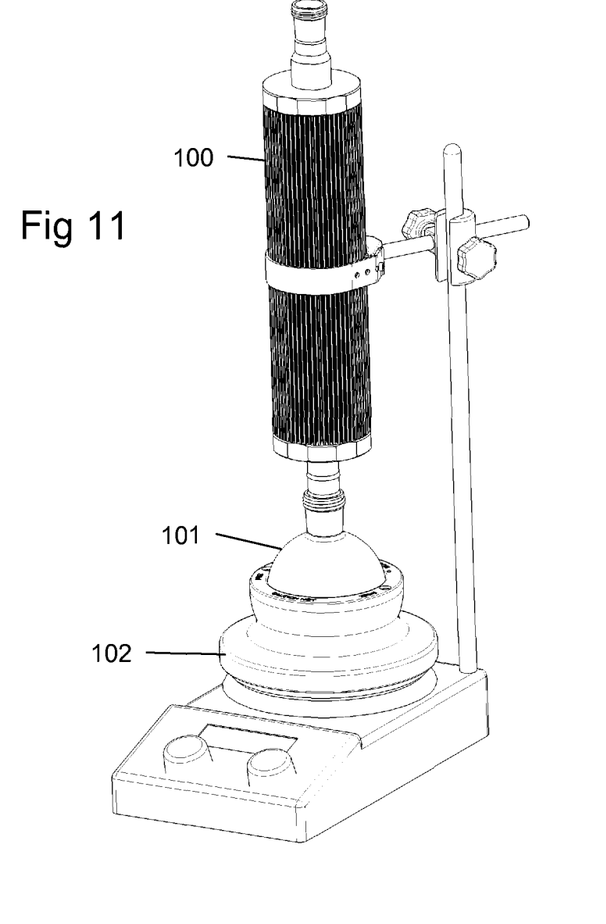
FIG. 11 shows a perspective view of an example experimental setup.

As the gas passes over the protrusions 6 of the inner tube, if the inner tube 1 is at less than the boiling point of the gas, the gas will condense and, if the bottom end 5 is lower than the top end, as in the experimental set up shown in FIG. 11 of the accompanying drawings, run down the internal bore 3 under gravity. It can then be collected in a flask 101. The flask 101 can either be the original flask from which the gas was evaporated (in which case the process is reflux) or a different flask (distillation or evaporation).

However, this will involve heat transfer to the inner tube 1. The liquid (e.g. water) 12 will conduct this heat away from the inner tube 1 to the outer tube 2 through the internal fins 9. The heat will pass through the outer tube 3 to the external fins, where it will be dissipated to the local atmosphere (as long as that is suitably cooler than the temperature of the gas).

A condenser 100 according to this embodiment was tested against a straight air-cooled condenser and an air-cooled Vigreux condenser. In each case, 50 millilitres of various solvents was placed in a 100 ml flask 101 on a heating block 102 set at 20 degrees centigrade above the solvent's boiling point. A condenser of each type was attached to the flask. The amount of solvent lost after increasing amount of time in millilitres was recorded as follows:

| Solvent | Boiling point (deg C.) | condenser type | 90 min | 300 min | 960 min |
|---|---|---|---|---|---|
| Methanol | 65 | Air | 3 | 5 | 12 |
| Methanol | 65 | Air Vigreux | 0 | 0 | 12 |
| Methanol | 65 | Embodiment | 0 | 2 | 5 |
| Ethanol | 78 | Air | 0 | 4 | 17 |
| Ethanol | 78 | Air Vigreux | 0 | 0 | 0 |
| Ethanol | 78 | Embodiment | 0 | 0 | 2 |
| Isopropyl Alcohol | 108 | Air | 2 | 4 | 15 |
| Isopropyl Alcohol | 108 | Air Vigreux | 0 | 0 | 0 |
| Isopropyl Alcohol | 108 | Embodiment | 0 | 0 | 2 |
| Diethyl ether | 35 | Air | 9 | na | na |
| Diethyl ether | 35 | Air Vigreux | 30 | na | na |
| Diethyl ether | 35 | Embodiment | 3 | 7 | 15 |
| Tetrahydrofuran | 66 | Air | 0 | 9 | na |
| Tetrahydrofuran | 66 | Air Vigreux | 2 | 5 | na |
| Tetrahydrofuran | 66 | Embodiment | 2 | 2 | 4 |
| Ethyl acetate | 77 | Air | 3 | 7 | 23 |
| Ethyl acetate | 77 | Air Vigreux | 0 | 0 | 3 |
| Ethyl acetate | 77 | Embodiment | 0 | 0 | 2 |
| Dioxane | 101 | Air | 0 | 0 | 0 |
| Dioxane | 101 | Air Vigreux | 0 | 0 | 2 |
| Dioxane | 101 | Embodiment | 0 | 0 | 2 |
| Heptane | 98 | Air | 0 | 0 | 4 |
| Heptane | 98 | Air Vigreux | 0 | 0 | 5 |
| Heptane | 98 | Embodiment | 0 | 0 | 3 |
| Acetonitrile | 82 | Air | 0 | 1 | 3 |
| Acetonitrile | 82 | Air Vigreux | 0 | 0 | 0 |
| Acetonitrile | 82 | Embodiment | 0 | 0 | 2 |
| Toluene | 111 | Air | 0 | 0 | 0 |
| Toluene | 111 | Air Vigreux | 0 | 0 | 0 |
| Toluene | 111 | Embodiment | 0 | 0 | 3 |
| Acetone | 57 | Air | 2 | 19 | na |
| Acetone | 57 | Air Vigreux | 2 | 12 | 30 |
| Acetone | 57 | Embodiment | 0 | 2 | 5 |
| Dichloromethane | 40 | Air | 9 | na | na |
| Dichloromethane | 40 | Air Vigreux | 5 | 30 | na |
| Dichloromethane | 40 | Embodiment | 2 | 2 | 5 |
| Chloroform | 61 | Air | 0 | 2 | 7 |
| Chloroform | 61 | Air Vigreux | 0 | 0 | 2 |
| Chloroform | 61 | Embodiment | 0 | 0 | 2 |

A water-cooled condenser in similar situations was found generally not to loose any solvent. As such, whilst the condenser of the present embodiment might not reach the efficiency of a water-cooled condenser, it can be seen from the above table that there is generally significantly less solvent loss than with standard air-cooled condensers. As such, the condenser of the present embodiment provides an improvement on such condensers without the need for a running water supply; the condenser of the present embodiment can be used with solvents having a lower boiling point than prior art air-cooled condensers, without needing to resort to a water-cooled condenser.

Figure 10:
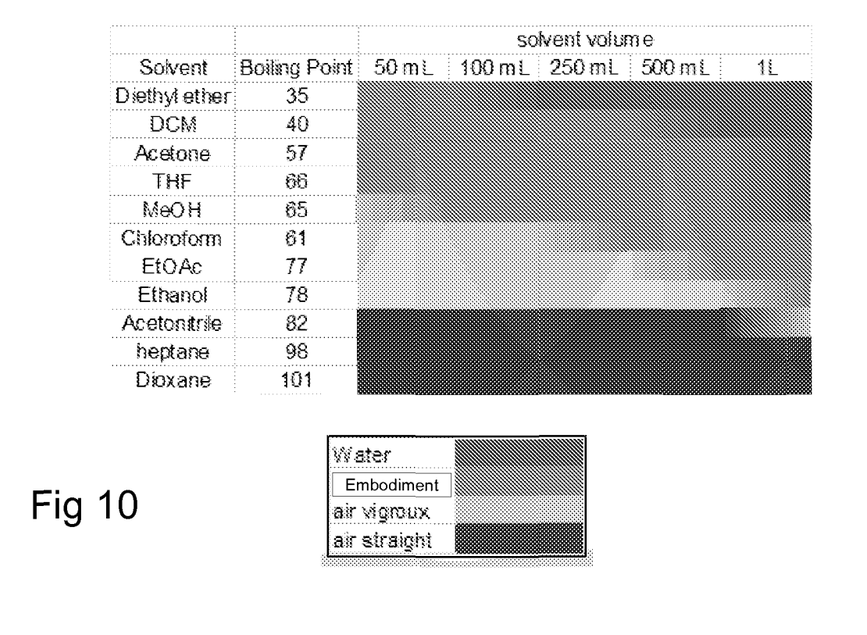
FIG. 10 shows a graphical table showing the acceptable condensers for various solvents.

This can be seen in FIG. 10, which shows which condensers (straight air-cooled, Vigreux air-cooled, the present embodiment and water-cooled) have been found to be acceptable for different solvents (for each condenser indicated, the condensers listed above in the key would also be acceptable). Here, acceptable is taken as less than 10% solvent loss (solvents with boiling point at 50 degrees C. and over), with heating set point 15C above boiling point, after 16 hours. The area indicated for the present embodiment would previously have required a water-cooled condenser.

Whilst the present embodiment has been described with reference to a laboratory setting, the invention could equally well be implemented on any desired scale, for example pilot plant or other industrial settings.

The condenser would be provided to a user/customer (e.g. a chemical synthesis laboratory) pre-assembled with the heat-transfer liquid encapsulated between the inner and outer tubes and the end seals already fitted and sealed to the inner and outer tubes. That is our preferred arrangement. An alternative is to provide the condenser at least partially disassembled to allow the user to put their own heat transfer liquid (e.g. water) between the first and second tubes, and to have the user seal the end(s).

The invention claimed is:

1. An air-cooled laboratory gas condenser for condensing gasses and vapours, comprising:
   an inner tube having an elongate length and a bore extending therethrough between a first end region and a second end region of the inner tube, the inner tube being made from glass;
   an outer tube having a bore therethrough and two ends, the inner tube passing through the bore of the outer tube, the outer tube being made from a metal material; and
   a respective seal at each end of the outer tube, sealing the outer tube to the inner tube at the first and second end regions so as to define an annular elongate sealed space between the inner tube and the outer tube extending along the elongate length of the inner tube between the seals, wherein:
   the sealed space is at least partly filled with a heat-conductive liquid such that the liquid is in contact with both the inner tube and the outer tube,
   the outer tube comprises a plurality of internal fins extending into the sealed space between the inner tube and the outer tube and a plurality of external fins extending outwardly from an outer surface of the outer tube,
   each of the seals comprise a first part, the first part having an external threaded portion that engages a corresponding internal thread formed in the bore of the outer tube at a respective one of the ends of the outer tube so as to fix the first portion relative to the outer tube,
   each of the seals further comprise a second part, the second part having an internal threaded portion that engages with a corresponding external thread of the first part so as to fix the first and second parts together,
   the first and second parts of the seals each have respective through-holes through which the inner tube passes, and
   the inner tube is provided with a key for inter-engaging with only one of the seals, the first and second parts of the seal for which the key is provided being arranged to fit either side of the key.

2. The condenser of claim 1, wherein the key comprises a bulge in an outer diameter of the inner tube.

3. The condenser of claim 1, wherein the key comprises a resilient gasket or sealing member held between the first and second components of the seal for which the key is provided.

4. The condenser of claim 1, wherein each of the internal and/or external fins is ridged.

5. The condenser of claim 1, wherein the internal fins of the outer tube are of a length such that they do not touch the surface of the inner tube.

6. The condenser of claim 1, wherein the heat conductive liquid fills greater than 85% of the sealed space.

7. The condenser of claim 1, wherein the outer surface of the inner tube has one or both of indentations or projections.

8. The condenser of claim 7, wherein the indentations are formed by inwardly-extending indents in the wall of the inner tube, the indents forming both inwardly-extending projections into the space inside the inner tube and inwardly-projecting hollows in the outer surface of the inner tube.

9. The condenser of claim 7, wherein the projections comprise a first and a second set of projections, the first set of projections being interleaved with the second set and rotated relative to the second set about a central axis of the inner tube.

10. The condenser of claim 7, wherein the inner tube has smooth regions, devoid of indentations, at respective positions where the inner tube seals with the seals.

11. The condenser of claim 1, wherein the first component is a common component to both of the seals.

12. The condenser of claim 1, wherein the second component differs between the seals.

13. The condenser of claim 12, wherein the through-hole provided in the second component of one of the seals has a greater diameter compared to the through-hole provided in the second component of the other of the seals.

14. An air-cooled laboratory gas condenser for condensing gasses and vapours, comprising:
   an inner tube having an elongate length and a bore extending therethrough between a first end region and a second end region of the inner tube, the inner tube being made from glass;
   an outer tube having a bore therethrough and two ends, the inner tube passing through the bore of the outer tube, the outer tube being made from a metal material; and
   a seal at each end of the outer tube, sealing the outer tube to the inner tube at the first and second end regions so as to define an annular elongate sealed space between the inner tube and the outer tube extending along the elongate length of the inner tube between the seals, wherein:
   the sealed space is at least partly filled with a heat-conductive liquid such that the liquid is in contact with both the inner tube and the outer tube,
   the outer tube comprises a plurality of internal fins extending into the sealed space between the inner tube and the outer tube and a plurality of external fins extending outwardly from an outer surface of the outer tube, and the inner tube is provided with a key for inter-engaging with only one of the seals to locate the tubes relative to each other.

* * * * *